US012179333B2

(12) United States Patent
Zolno et al.

(10) Patent No.: US 12,179,333 B2
(45) Date of Patent: Dec. 31, 2024

(54) RETRACTABLE BIT STORAGE SYSTEM

(71) Applicant: iEnvizion, LLC, Anaheim, CA (US)

(72) Inventors: Aragorn Zolno, Anaheim, CA (US); Wilson Fajardo, Anaheim, CA (US)

(73) Assignee: iEnvizion, LLC

( * ) Notice: Subject to any disclaimer, the term of this patent is extended or adjusted under 35 U.S.C. 154(b) by 0 days.

(21) Appl. No.: 17/690,393

(22) Filed: Mar. 9, 2022

(65) Prior Publication Data

US 2022/0288769 A1 Sep. 15, 2022

Related U.S. Application Data

(60) Provisional application No. 63/158,648, filed on Mar. 9, 2021.

(51) Int. Cl.
*B25H 3/00* (2006.01)
*B25F 5/00* (2006.01)

(52) U.S. Cl.
CPC ............... *B25H 3/003* (2013.01); *B25F 5/00* (2013.01)

(58) Field of Classification Search
CPC . B25H 3/003; B25H 3/006; B25F 5/00; B25F 5/02; Y10T 24/1397; A45F 2200/0575; A45F 2200/0566
See application file for complete search history.

(56) References Cited

U.S. PATENT DOCUMENTS 5,711,055 A * 1/1998 Quick ................ H01R 13/6392 24/3.13
6,325,577 B1 * 12/2001 Anderson ............... A45F 5/021 224/904
9,701,008 B2 * 7/2017 Cho ......................... B25F 5/029
11,504,840 B2 * 11/2022 Rudolph ................... B25F 5/02
2005/0258203 A1 * 11/2005 Weaver ................... A45F 5/004 224/904
2010/0000054 A1 * 1/2010 Roser ................... H04R 1/1091 24/3.12
2015/0168098 A1 * 6/2015 Ringgenberg .......... F41A 17/02 24/3.2
2017/0282351 A1 * 10/2017 Da Rosa ................ B25H 3/003
2022/0024024 A1 * 1/2022 Garant ....................... B25F 5/02
2022/0250166 A1 * 8/2022 Pineault ................. B25H 3/003

* cited by examiner

*Primary Examiner* — Robert Sandy
*Assistant Examiner* — Rowland Do
(74) *Attorney, Agent, or Firm* — Elizabeth Yang

(57) ABSTRACT

A bit or tool holder attachment including: a main body, having a connecting body mounted on electric drill or electric driver or power tool or manual tool, and a string and a cable retracting device are arranged in the main body, and one end of the string is fixed on a fixing body; and at least one bit or tool holder, having a movable body and a fixing ring, an attaching hole is arranged in middle of the fixing ring for a bit or tool to pass through and be attached in the fixing ring, and a ring-shaped recess is also arranged on outer surface of the fixing ring, and the movable body is sleeved on the ring-shaped recess, and one end of the movable body is connected with the fixing body, so that the bit or tool holder can be extended and retracted relative to the main body.

8 Claims, 4 Drawing Sheets

RETRACTABLE BIT STORAGE SYSTEM

CROSS-REFERENCES TO RELATED APPLICATIONS

This non-provisional application claims priority under 35 U.S.C. § 119(a) on U.S. Provisional Patent Application No. 63/158,648 filed on Mar. 9, 2021, the entire contents of which are hereby incorporated by reference.

FIELD OF THE INVENTION

The present invention relates generally to a bit or tool holder attachment to be used with an electric drill, an electric driver, or a generic electric power tool or manual tool that allows tool changing capabilities and more particularly, the present invention discloses a bit or tool holder attachment having the function that the bit or tool will automatically return to the storage position after use, and the position of the bit or tool is convenient for users to quickly find and use.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything, stated or implied therein or inferred thereupon.

According to the conventional bits or tools, to meet the different needs of the required size, the sizes and types of the bits or tools are also extremely wide, and most of the bits or tools are purchased in a single or several pieces according to the required size. After purchasing multiple bits or tools, the storage of the bits or tools is often scattered because they cannot be accommodated easily. The most common storage method is to put all the bits or tools in an empty box. When the user needs to use a certain size or type of bit or tool, he or she will need to take out the box and look for the one he or she needs from all the bits or tools. However, it is not only troublesome and low-efficiency for the user to search for the bit or tool, but also the contact between the bits or tools is easy to cause wear of the bits or tools, thereby affecting the quality of the bit or tools. Although the structure of the box with the built-in slots has been introduced successively, and the slots are directly provided on the device that uses the bit or tool such as the electric drill, etc., so as to accommodate various bit or tools, it is still more troublesome to take out the bit or tool and use.

In addition, when the user removes the bit or tool from the chuck after using the electric drill, electric driver, power tool or manual tool, the bit or tool needs to be additionally placed in the above-mentioned accommodating structure, so as to prevent the user from being unable to find the bit or tool when he or she needs to use it next time. However, users do not remember to do these steps every time when they finish using the electric drill, electric driver, power tool, or manual tool, and often the bit or tools are misplaced and cannot be found when they are needed to be used later, or the misplacement makes the bit or tool much more difficult to find.

Therefore, how to store the bit or tool easier and avoid the situation that the bit or tool is hard to find after usage is the main problem that the applicant wants to solve.

SUMMARY

In order to solve the problem above, the present invention provides a bit or tool holder attachment, which can let the bit or tool automatically return to the storage position after use, and the position of the bit or tool is convenient for users to quickly find and use.

A bit or tool holder attachment which is used to attach on an electric drill, an electric driver, power tool, or manual tool comprising:

a main body, having one end extended with a connecting body to be mounted on the electric drill, the electric driver, power tool, or manual tool and at least one string and at least one cable retracting device are arranged in the main body, and one end of the string is fixed on the cable retracting device, the other end passes through a hole on the surface of the main body and is fixed on a fixing body, and the fixing body is located on the outer surface of the main body; and at least one bit or tool holder, having a movable body and a fixing ring, an attaching hole is arranged in the middle of the fixing ring for a bit or tool to pass through and be attached in the fixing ring, and a ring-shaped recess is also arranged on the outer surface of the fixing ring, and the movable body is sleeved on the ring-shaped recess, and one end of the movable body is connected with the fixing body, so that the bit or tool holder can be extended and retracted relative to the main body;

wherein when the bit or tool attached in the fixed ring is installed on the electric drill or the electric driver or power tool or manual tool, the movable body can rotate on the ring-shaped recess relative to the fixing ring, so the string will not be wound around on a chuck of the electric drill or the electric driver, power tool or manual tool;

wherein when the bit or tool attached in the fixing ring is separated from the chuck, the string will be automatically retracted by the cable retracting device, so that the bit or tool holder automatically returns to the surface of the main body.

In another aspect, the cable retracting device is provided with a spring and a reel, the string is wound on the reel and one end of the string is fixed on the reel; when the string is pulled out from the reel, the spring on the reel is tensioned; when the bit or tool is released from the chuck, the string is rewound onto the reel by retracting force of the spring.

In another aspect, the bit or tool holder attachment further comprises a casing, which covers the main body, and the casing is provided with an accommodating hole corresponding to the position of the hole so that the bit or tool holder can pass through and be placed outside the casing.

In another aspect, the connecting body has a first assembly and a second assembly, and after the first assembly and the second assembly are connected to each other, an accommodating space is formed in the middle for accommodating a handle of the electric drill or the electric drill so that the main body attached to the handle.

In another aspect, a portion between the main body and the connecting body is provided with a plurality of storage holes for storing and accommodating other bit or tools.

In another aspect, the portion between the main body and the connecting body is a bendable structure.

In another aspect, the storage holes and the attaching hole are standard hexagonal or circular holes. The shape of the storage or attaching holes are not limited to this embodiment.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
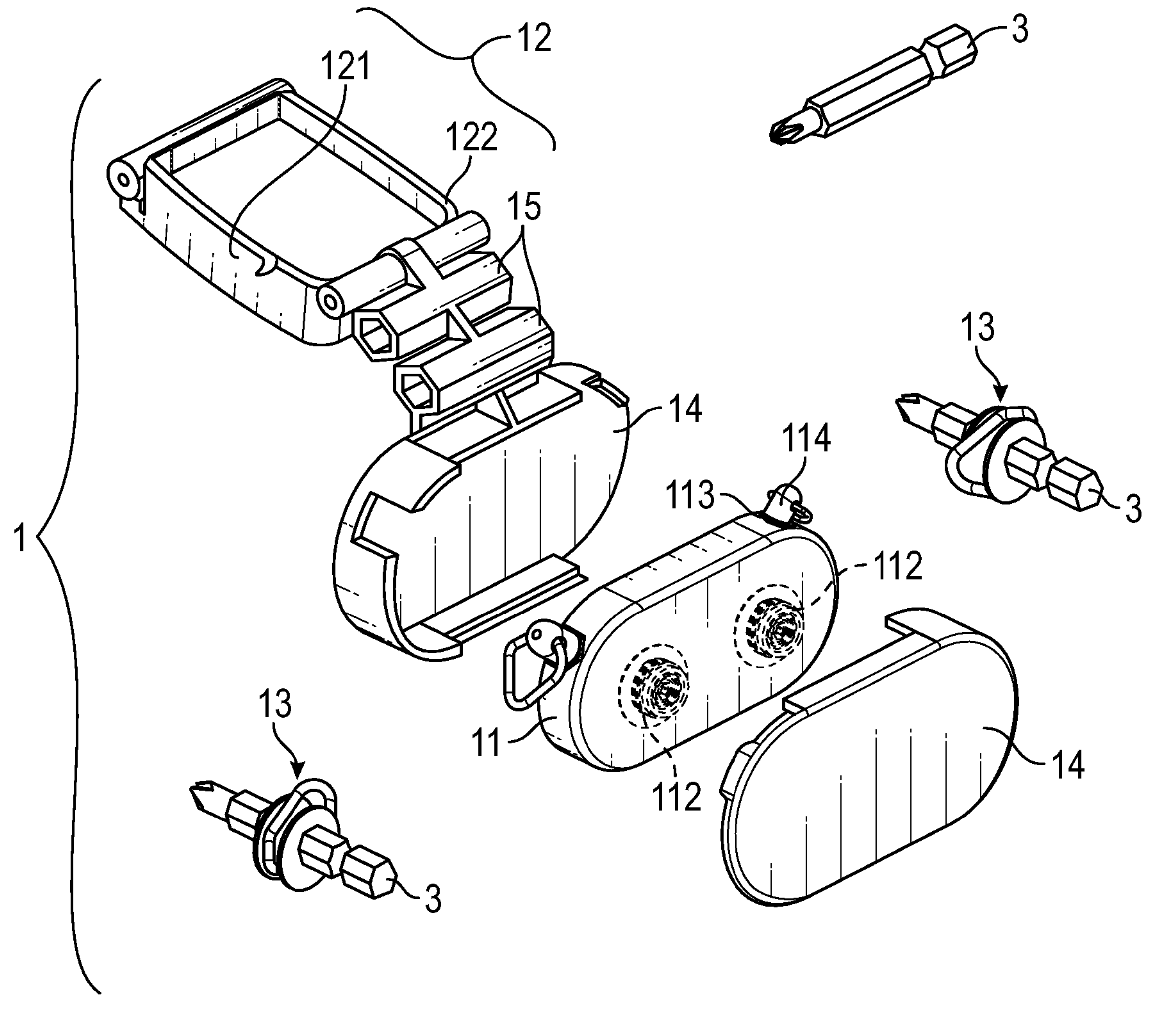
FIG. 1 shows an exploded view of the preferred embodiment of the bit or tool holder attachment.
Figure 2:
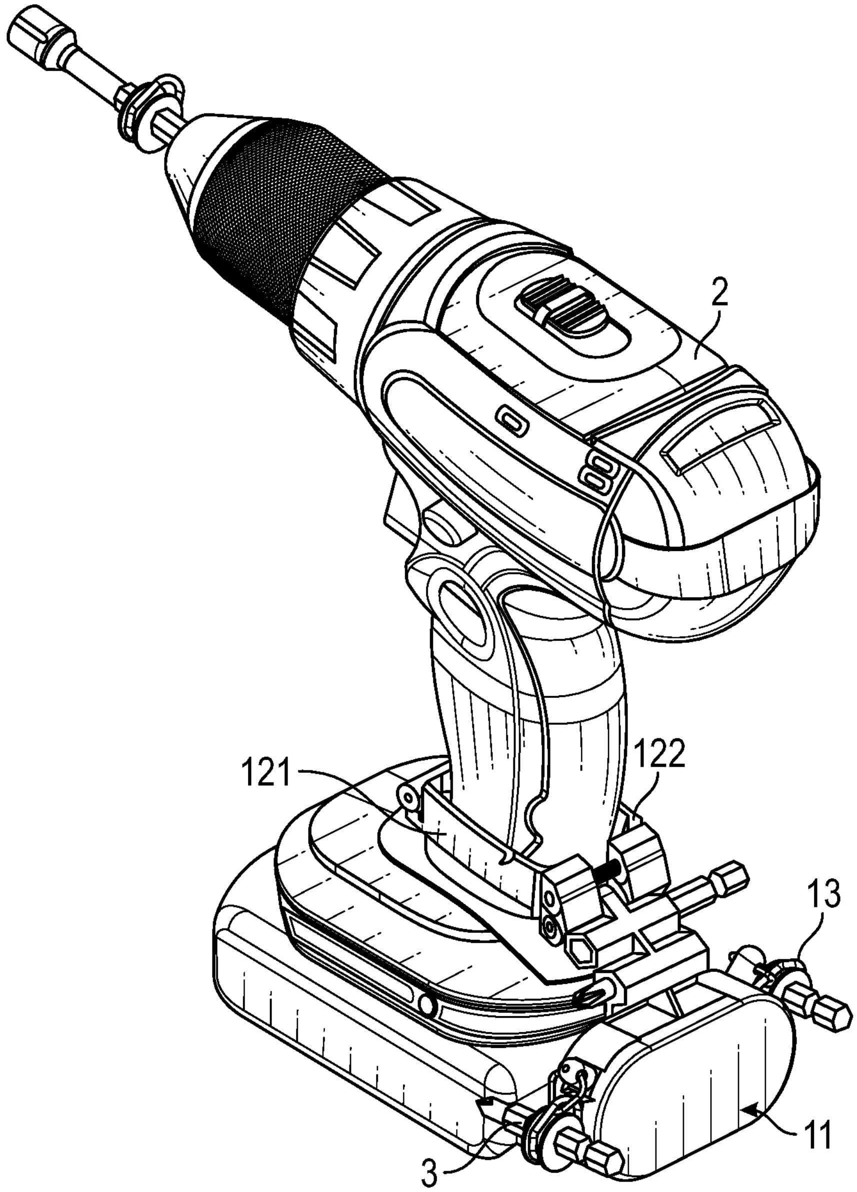
FIG. 2 shows a perspective view of the preferred embodiment of the bit or tool holder attachment attaches to the electric drill, electric driver, power tool or manual tool.
Figure 3:
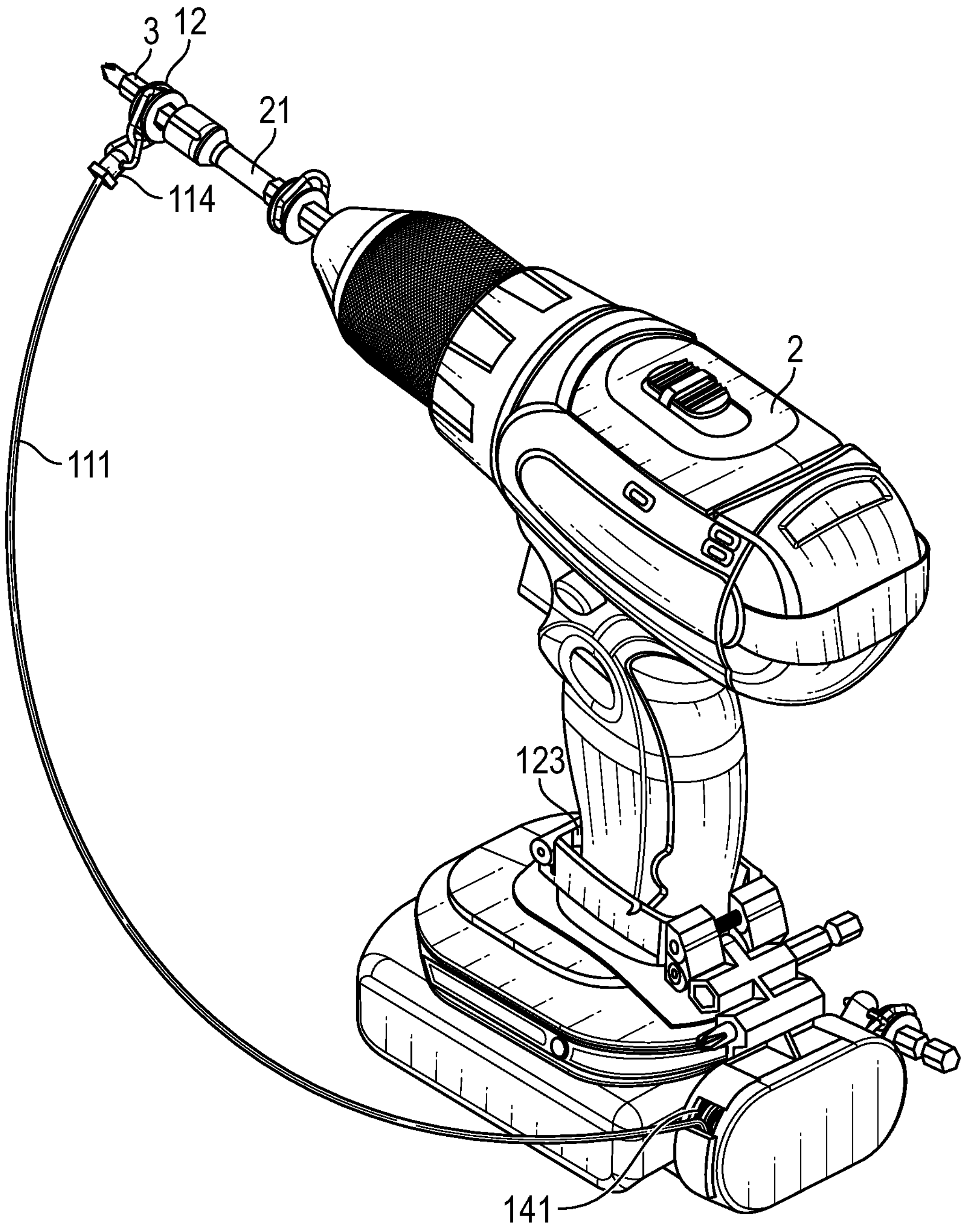
FIG. 3 shows a perspective view of the preferred embodiment of the bit or tool holder attachment while the electric drill, electric driver, power tool or manual tool is in use.

Please refer to FIGS. 1-3, they show an exploded view of the preferred embodiment of the bit or tool holder attachment, a perspective view of the preferred embodiment of the bit or tool holder attachment attaches to the electric drill, and a perspective view of the preferred embodiment of the bit or tool holder attachment while the electric drill is in use. The bit or tool holder attachment 1 which is used to attached on an electric drill, an electric driver or power tool or manual tool 2, comprising:

- a main body 11, having one end extended with a connecting body 12 to be mounted on the electric drill or the electric driver or power tool or manual tool 2, and at least one string 111 and at least one cable retracting device 112 are arranged in the main body 11, and one end of the string 111 is fixed on the cable retracting device 112, the other end passes through a hole 113 on surface of the main body 11 and is fixed on a fixing body 114, and the fixing body 114 is located on outer surface of the main body 11; and
- at least one bit or tool holder 13, having a movable body 131 and a fixing ring 132, an attaching hole 1321 is arranged in middle of the fixing ring 132 for a bit or tool 3 to pass through and be attached in the fixing ring 132, and a ring-shaped recess 1322 is also arranged on outer surface of the fixing ring 132, and the movable body 131 is sleeved on the ring-shaped recess 1322, and one end of the movable body 131 is connected with the fixing body 114, so that the bit or tool holder 13 can be extended and retracted relative to the main body 11;

In use, the user only needs to install the bit or tool 3 that needs to be used on the fixed ring 132, and then installs the bit or tool 3 on the electric drill or the electric driver or power tool or manual tool 2 to directly use the electric drill or the electric driver or power tool or manual tool 2. And, since the movable body 131 can rotate on the ring-shaped recess 1322 relative to the fixing ring 132, so when the user operates the electric drill or the electric driver or power tool or manual tool 2, the string 111 will not be wound around on a chuck 21 of the electric drill or the electric driver or power tool or manual tool 2, thereby ensuring the safety of users using the electric drill or the electric driver or power tool or manual tool 2. There are many ways to mount the bit or tool 3 on the fixed ring 132. In this embodiment, a magnet is used on the surface of the attaching hole 1321 of the fixed ring 132. However, in other embodiments, the fixed ring 132 may also be provided with a clip (not shown) to clamp the bit or tool 3 on the fixed ring 132, or attach the bit or tool 3 in the attaching hole 1321 by rotating and tightening methods (not shown), or attach the bit or tool 3 in the attaching hole 1321 by press fit or friction. In addition, in this embodiment, a portion between the main body 11 and the connecting body 13 is provided with a plurality of storage holes 15 for storing and accommodating other bits or tools 3. This allows users to quickly exchange the bits or tools 3 placed in the storage holes 15 with the bits or tool 3 attached on the fixed ring 132 for ease of use, and at the same time, it can increase the number of bits or tools 3 stored, thereby improving the practicability of the present invention. It is worth noting that in this embodiment, the storage holes 15 and the attaching holes 1321 are standard hexagonal holes, but holes of different shapes can also be provided for installing or placing bits or tools of different shapes. Therefore, the manner of installation and the shape of the holes are not limited to this embodiment.

When the user finishes using the electric drill or the electric driver or power tool or manual tool 2, the user only needs to remove the bit or tool 3 from the chuck 21 by hand and release the bit or tool 3 directly, the bit or tool 3 will automatically retract to the surface of the main body 11 through the retraction of the string 111 due to the retracting force generated by the cable retracting device 112. From this special structure, it can be seen that the present invention does not require the user to place and store the bit or tool 3 after use, so it can save time for storage, and because the bit or tool 3 is stored on the surface of the main body 11, and the main body 11 is installed on the electric drill or the electric driver or power tool or manual tool 2 (in this embodiment, it is installed behind the drill or driver), so the time of searching for the bit or tool 3 to be used can be saved in the next use, and the loss of the bit or tool 3 can also be prevented.

Figure 4:
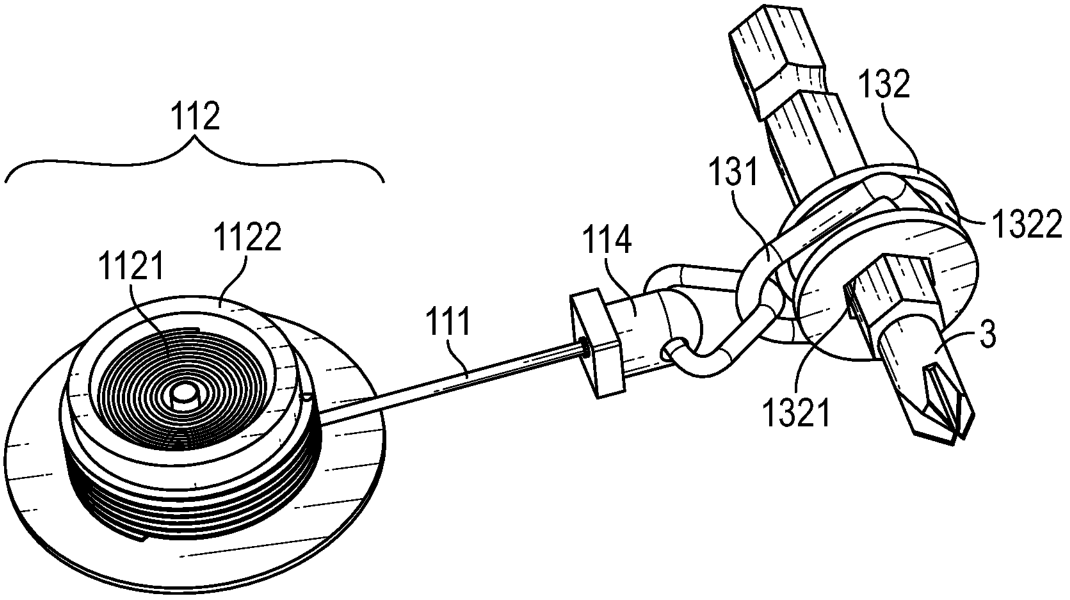
FIG. 4 shows a perspective view of the preferred embodiment of the cable retracting device connecting to bit or tool holder.

Please refer to FIG. 4, it shows a perspective view of the preferred embodiment of the cable retracting device 112 connecting to bit or tool holder 13. In this embodiment, the cable retracting device 112 is provided with a spring 1121 and a reel 1122, the string 111 is wound on the reel 1122 and one end of the string 111 is fixed on the reel 1122. When the string 111 is pulled out from the reel 1122, the spring 1121 on the reel 1122 is tensioned, and a retracting force is continuously generated in an attempt to retract the string 111. Therefore, when the bit or tool 3 is released from the chuck 21, the string 11I is rewound onto the reel 1122 by the retracting force of the spring 1121. With this special structure, the string 1121 can be stretched or retracted repeatedly, without worrying about the string 111 being entangled in the main body 11, which makes it unusable next time, and with the retracting force generated by the tension of the spring 1121, the users also do not need to poke the string 111 back into the hole 113 by themselves, thereby saving the user's time and indirectly improving the user's willingness to use the case.

In some embodiments, the present invention further a casing 14, which covers the main body 11, and the casing 14 is provided with an accommodating hole 141 corresponding to the position of the hole 113, so that the bit or tool holder 13 can pass through and be placed outside the casing 14. With the protection of the casing 14, the main body 11 is less likely to be damaged by external forces to improve its durability. In addition, the connecting body 12 can also have a first assembly 121 and a second assembly 122, and after the first assembly 121 and the second assembly 122 are connected to each other, an accommodating space 123 is formed in the middle for accommodating a handle of the electric drill or the electric driver or power tool or manual tool 2, so that the main body 11 attached to the handle. Through the additional settings of the first assembly 121 and the second assembly 122, the main body 11 can be freely combined or separated with any kind of electric drill or electric driver or power tool, or manual tool 2 to improve the practicality of the present invention.

In some embodiments, the portion between the main body 11 and the connecting body 12 can also be a bendable structure. This can increase the mobility of the main body 11 in various operating environments, allowing users to adjust the angle of the main body 11 according to the actual operating space, so as to improve the convenience and efficiency of using the electric drill or the electric driver or power tool or manual tool.

In other embodiments, the connecting body can also be attached to the bottom of the main body, while the bottom of the main body has a corresponding attaching portion for attaching the connecting body. In these embodiments, the connecting body can be a Velcro strap or other sticky materials or a mechanical bracketry device that can attach the main body to the user's wrist or other devices that the user wants to keep a "standard" tool close by. Therefore, the present invention can be easily attached to almost anything or anywhere to improve the practicality of the present invention.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A bit or tool holder attachment which is used to attach on an electric drill or an electric driver or power tool or manual tool, comprising:

a main body, having one end extended with a connecting body to be mounted on the electric drill or the electric driver or power tool or manual tool, and at least one string and at least one cable retracting device are arranged in the main body, and one end of the string is fixed on the cable retracting device, the other end passes through a hole on surface of the main body and is fixed on a fixing body, and the fixing body is located on outer surface of the main body; and at least one bit or tool holder, having a movable body and a fixing ring, an attaching hole is arranged in middle of the fixing ring for a bit or tool to pass through and be attached in the fixing ring, and a ring-shaped recess is also arranged on outer surface of the fixing ring, and the movable body is sleeved on the ring-shaped recess, and one end of the movable body is connected with the fixing body, so that the bit or tool holder can be extended and retracted relative to the main body;

wherein when the bit or tool attached in the fixed ring is installed on the electric drill or the electric driver or power tool or manual tool, the movable body can rotate on the ring-shaped recess relative to the fixing ring, so the string will not be wound around on a chuck of the electric drill or the electric driver or power tool or manual tool;

wherein when the bit or tool attached in the fixing ring is separated from the chuck, the string will be automatically retracted by the cable retracting device, so that the bit or tool holder automatically returns to the surface of the main body.

2. The bit or tool holder attachment of claim 1, wherein the cable retracting device is provided with a spring and a reel, the string is wound on the reel and one end of the string is fixed on the reel; when the string is pulled out from the reel, the spring on the reel is tensioned; when the bit or tool is released from the chuck, the string is rewound onto the reel by retracting force of the spring.

3. The bit or tool holder attachment of claim 2, wherein the surface of the attaching hole is provided with a magnet.

4. The bit or tool holder attachment of claim 3, further comprising a casing, which covers the main body, and the casing is provided with an accommodating hole corresponding to the position of the hole, so that the bit or tool holder can pass through and be placed outside the casing.

5. The bit or tool holder attachment of claim 4, wherein the connecting body has a first assembly and a second assembly, and after the first assembly and the second assembly are connected to each other, an accommodating space is formed in the middle for accommodating a handle of the electric drill or the electric drill, so that the main body attached to the handle.

6. The bit or tool holder attachment of claim 5, wherein a portion between the main body and the connecting body is provided with a plurality of storage holes for storing and accommodating other bit or tools.

7. The bit or tool holder attachment of claim 6, wherein the portion between the main body and the connecting body is a bendable structure.

8. The bit or tool holder attachment of claim 7, wherein the storage holes and the attaching hole are standard hexagonal holes.

* * * * *